United States Patent [19]

Rueckl

[11] Patent Number: 4,695,323
[45] Date of Patent: Sep. 22, 1987

[54] HIGH STRENGTH COKE-OVEN MORTAR

[75] Inventor: Roger L. Rueckl, Washington Township, Westmoreland County, Pa.

[73] Assignee: United States Steel Corporation, Pittsburgh, Pa.

[21] Appl. No.: 851,189

[22] Filed: Apr. 14, 1986

Related U.S. Application Data

[63] Continuation-in-part of Ser. No. 677,422, Dec. 3, 1984, Pat. No. 4,596,601.

[51] Int. Cl.$^4$ .............................................. C04B 12/02
[52] U.S. Cl. ........................................ 106/85; 106/314
[58] Field of Search ................................... 106/85, 314

[56] References Cited

U.S. PATENT DOCUMENTS

| | | | |
|---|---|---|---|
| 3,730,744 | 5/1973 | Yavorsky | 106/85 |
| 4,508,835 | 4/1985 | Kanink et al. | 106/85 |
| 4,522,926 | 6/1985 | Felice | 106/85 |

FOREIGN PATENT DOCUMENTS 55-167184  12/1980  Japan ..................................... 106/85

*Primary Examiner*—William R. Dixon, Jr.
*Assistant Examiner*—Steven Capella
*Attorney, Agent, or Firm*—William F. Riesmeyer, II

[57] ABSTRACT

A high strength mortar has been developed for use with silica brick, in the construction of coke-oven heating walls. When fired to conventional coke oven temperatures of about 1100° C., the mortar develops a tensile strength within the mortar itself, and a tensile bond to the silica brick, which exceeds the tensile strength of the silica brick. The mortar is composed of three primary solid constituents: 25 to 88 percent $SiO_2$, 6 to 65 percent $Al_2O_3$ and 4 to 12 percent $P_2O_5$. To achieve such high tensile strength, the other solid constituents must be maintained at a minimum, desirably less than four percent and preferably less than two percent.

8 Claims, No Drawings

HIGH STRENGTH COKE-OVEN MORTAR

The application is a continuation-in-part of U.S. patent application Ser. No. 677,422 filed Dec. 3, 1984, now U.S. Pat. No. 4,596,601.

TECHNICAL FIELD

This invention relates to the construction of coke-oven heating walls and is more particularly related to the use of a mortar which provides high tensile strength bonding with the silica brick utilized in the construction of coke oven heating walls.

BACKGROUND ART

In an attempt to increase the rate of the production of coke, the art has resorted to (i) the use of coke-ovens with heights exceeding 16 feet (>4.88 meters), (ii) the selection of coal blends which provide higher bulk densities and (iii) the use of faster coking rates—all of which lead to increased coking pressures. Such increased coking pressures result in flexure of the coke-oven wall which, in turn, results in stress concentrations in the refractory shapes and ultimately the failure of the refractories and loss of wall integrity. It has been found that the wall's inability to resist such increased pressure is, in large part, due to the fact that (a) existing mortars do not develop sufficient tensile bond strength to the brick and (b) such existing mortars acquire, during service, high compression and shear strengths which decrease the ability of the mortar to yield and thereby relieve stresses caused by wall flexure. These limitations of such currently available materials of construction (i.e. silica brick and silica coke-oven mortar) result in severe operating limits and reduced coke battery throughput, in addition to significantly reduced battery life.

DISCLOSURE OF INVENTION

A new high strength mortar has been developed for coke battery construction which; (1) develops a tensile bond strength within itself and to the surfaces of the silica brick to which it bonds, that is at least equivalent to the tensile strength of the silica brick itself under actual coking conditions, (2) in addition to its high strength bond, is resistant to deformation under load, but nevertheless is capable of yielding under stresses that exceed the normal static stress of the battery and (3) is capable of being mixed to a consistency that permits its use in construction procedures conventionally used to install refractories in a coke oven heating walls. Because of its enhanced tensile properties, it is estimated that use of the inventive mortar can provide productivity increases of from 10 to 15 percent, per coke oven. Thus, while the new mortar composition is more costly to supply (than conventional coke-oven silica mortar) such increased purchase cost is more than offset by savings of: (a) the added capital cost for the construction of additional ovens (i.e. 10 to 15 percent additional ovens) required to match the capacity of a coke oven battery constructed with the inventive mortar and (b) future capital requirements resulting from an anticipated service life of about 30 years, compared with the average service life of less than 15 years provided by silica coke-oven mortar.

These and other advantages of the instant invention will become more apparent from the following detailed description when read in conjunction with the appended claims.

MODES FOR CARRYING OUT THE INVENTION

As previously noted, the prinicipal design parameter for the instant mortar is that it develop a tensile bond strength, both within its mass and to the brick surfaces to which it is applied, which (at battery operating temperatures) approximately equals or exceeds that of the silica brick. Silica brick has a tensile strength of about 190 psi (134.39 kg/cm$^2$) at 1100° C. 2012° F. and 90 psi (63.28 kg/cm$^2$) at 1350° C. (2462° F.). These criteria are provided by a silica base, alumina bearing, phosphate-bonded mortar in which impurities are maintained at a minimum level, desirably below 4 percent and preferably below 2 percent. The primary constituent, for the production for the mortar, can be supplied by either the crystalline or amorphous form of silica. If the crystalline form is used, the high temperature forms crystobalite or tridymite are preferred over the lower temperature quartz form, so as to avoid the possibility of volume changes resulting from phase transformation. Since it is desired to maintain impurities to a minimum, amorphous or fused silica is preferred over the crystalline form, since the former is of generally of higher purity and is more readily commercially available. The alumina can be supplied from any high purity source, such as tabular Al$_2$O$_3$. The phosphate bond can be developed through the use of phosphoric acid, but the P$_2$O$_5$ is preferably provided by a commercially available bonding agent such as colloidal monaluminum phosphate (MAP). More phosphate is retained in the mortar after firing at elevated temperatures when colloidal phosphate is used. The amount of phosphate retained after firing directly affects the level of hot tensile strength of the mortar as more fully explained below.

The sizing of the silica and alumina should be controlled so that: (1) the mortar has a workable and trowelable consistency, (2) the blend of the constituents result in a homogenous mixing, and (3) the cured mortar has minimum apparent porosity and maximum bulk density. It is desirable that the granular materials be finer than 40 U.S. Standard mesh (420 microns) and preferably finer than 70 mesh (210 microns) for workability, and to gap size the granular material, that is use a coarser fraction, such as 70–100 mesh (210μ–149 microns), and a finer fraction, such as finer than 200 mesh (74 microns) to minimize apparent porosity and to maximize bulk density. The amount of the finer fraction just mentioned, i.e. having a size finer than 200 mesh (74 microns), should not be more than 45 percent, preferably not more than 35 percent, in order to obtain desirable high hot tensile strength levels. Mortars containing more than 60 percent–200 mesh particles (finer than 74 microns) had hot tensile strength of only about 80 psi (56.25 kg/cm$^2$) at 1100° C. (2012° F.), even with other factors all being within desirable ranges. The alumina will generally be of a size finer than the silica to achieve chemical homogeneity. However, it is desirable that not more than about 40 percent of the alumina shall have a size less than 200 mesh (74 microns) so as not to decrease strength. If a MAP solution is used, the mortar would be supplied wet and ready to use; a dry phosphate binder such as MAP or hexaphos can be used, in which case the mortar would have to be mixed with water. This would generally be less desirable than pre-mixed mortar, because of the potential for mixing errors which, in turn, could adversely affect mortar strength. In this regard, it has been found that the amount of liquid in the mortar should be limited so that the weight loss of the mortar on drying at 104° C. (220° F.) should not exceed 13.5 percent. Liquid contents resulting in a higher weight loss significantly decrease the hot tensile strength of the mortar. Another useful measure which correlates with mortar strength is weight at loss after heating to 1100° C. (2012° F.). The weight loss at this higher temperature is greater than at 104° C. (220° F.) because of a thermal breakdown of hydrated phosphate, as well as the volatilization of unreacted $P_2O_5$ primarily supplied by phosphoric acid. It has been found that the weight loss upon drying at 1100° C. (2012° F.) should not exceed 15 percent so that hot tensile strength is not adversely affected.

The composition of the cured and dried mortar on a water-free basis will be within the range 25 to 88 percent $SiO_2$, 6 to 65 percent $Al_2O_3$, and 4 to 12 percent $P_2O_5$ with total other constituents being less than 4 percent. Within this compositional range, tensile strength is affected both by silica-alumina ratio and by phosphate content. In general, strength will increase with decreasing $SiO_2/Al_2O_3$ ratios. For example, at a $P_2O_5$ content of 9.3%, a tensile strength greater than 200 psi (140.6 kg/cm$^2$) at 1100° C. can be achieved when $SiO_2/Al_2O_3 \leq 4$—with strength further increasing until $SiO_2/Al_2O_3$ is reduced to about 2. Further decreases in the $SiO_2/Al_2O_3$ ratio cause a slight decrease in strength, although it remained above 140.6 kg/cm$^2$ (for a $P_2O_5$ content of 9.3%) at ratios as low as 0.4. Similarly, strength markedly increases as $P_2O_5$ content is decreased from 12% down to 8%. However, further decreases in $P_2O_5$ result in a rapid decrease in strength. To maximize tensile bond strength and resistance to deformation under load, the preferred range will therefore be (on a water-free basis) 60 to 70 percent $SiO_2$, 25 to 35 percent $Al_2O_3$, and 7 to 11 percent $P_2O_5$ (more preferably 8 to 10%) with total other solid constituents being less than 2 percent.

As alluded to in the description above, unreacted $P_2O_5$ derived from phosphoric acid tends to volatize at elevated temperature. It has been found that retention of at least 7 percent $P_2O_5$ in the mortar after firing at elevated temperature is essential to provide the mortar with a hot tensile strength about equivalent to that of silica brick. Therefore, it is desirable for obtaining strength of that level that at least 70 percent of the $P_2O_5$ be provided in colloidal form such as the colloidal monaluminum phosphate previously mentioned. Preferably, substantial all of the $P_2O_5$ should be provided by phosphate in colloidal form. However, when substantially all of the $P_2O_5$ is provided by phosphate in colloidal phosphate and the water content is limited as just mentioned, the resultant mortar is very sticky and has poor ability to wet silica brick. Therefore, it is desirable to include a surfactant in the mortar to enhance wettability and reduce its sticky nature. Also, a surfactant greatly reduces the tendency for separation of the liquids and solids in the mortar. The surfactant should be compatible with strongly acidic mixtures such as those based on MAP and have a low foaming characteristic. Generally, a range of 0.01 to 0.10 weight percent of surfactant may be used. Two suitable surfactants would be ZONYL FSN manufactured by DuPont and TERGITOL nonionic MIN FOAM IX made by Union Carbide. The use of surfactant had no effect on hot tensile strength of the mortar. As is the case with other phosphate bonded mortars, the mortar of this invention should not be used at temperature below about 4.4° C. (40° F.) or 10° C. (50° F.) because the aluminum phosphate binder phase has a tendency to gel at low temperatures and as a result liquid in the mortar cannot be absorbed by the brick. Liquid absorption is the primary mechanism of mortar set for this type of system.

As a specific example of this invention, 52.5 percent by weight fused silica grain (31.5 percent minus 150 mesh and 21.0 percent minus 50, plus 100 mesh), 20.6 percent by weight minus 100-mesh tabular alumina, 23.1 percent by weight colloidal monaluminum phosphate (8.0 percent $Al_2O_3$, and 30 percent $P_2O_5$), and 3.8 percent by weight water were blended into a workable mortar. When fired to 2000° F. (1093° C.), this mortar develops a tensile bond to silica brick and within itself that exceeds the tensile strength of the silica brick. The apparent porosity of a trowelbed joint fired to 2000° F. (1093° C.) is less than 30 percent. The composition of the fired mortar is 64.1 percent $SiO_2$, 27.4 percent $Al_2O_3$, and 8.5 percent $P_2O_5$.

Additional tests were carried out to determine the effect of particle size distribution and moisture loss on hot tensile strength. Table I below shows three mixtures prepared from various proportions of commercially available fused silica and tabular alumina having the particle sizes indicated.

TABLE I

| | Mix Proportions of Dry Constituents | | | | |
|---|---|---|---|---|---|
| | Percent Fused Silica Grain*, | | | | |
| Mix | Mesh −30, +50 Microns −590, +297 | Mesh −50, +100 Microns −297 +149 | 125I** | Percent Alcoa T61 Tabular Alumina −60 Mesh*** | % Clay |
| A | 19.3 | 32.7 | 16.6 | 29.4 | 2.0 |
| B | 13.1 | 22.3 | 33.2 | 29.4 | 2.0 |
| C | 7.4 | 11.8 | 49.8 | 29.4 | 2.0 |

*CE Minerals Company mesh size designations for its TECO-SIL fused silica grain.
**125I is a commercial designation for a size distribution of approximately: 100% −60 mesh (−250 microns); 14% −60 +100 mesh (−250 +149 microns); 11% −100 +140 mesh (−149 +105 microns); 13% −140 +200 mesh (−105 +74 microns); 62% −200 mesh (−74 microns).
***Nominal mesh size designation. A typical size distribution is: 6.8% −60 mesh (−150 microns); 0.1% −80 +100 mesh; (−177 +149 microns); 37.7% −100 +150 mesh (−149 +105 microns); 18.7% −150 +200 mesh (−105 +74 microns);36.8% −200 mesh (−74 microns).

Tables II, III and IV below show hot tensile strength at 1100° C. (2012° F.) for test samples of mortars made from the various mixes of Table I together with the moisture loss after heating at 104° C. (220° F.) and the particle size distribution determined by actual screen analysis.

TABLE II

| Sample No. | Dry(1) Mix | ZDNYL FSN, % | Actual Wet Screen Analysis, % | | | Moisture Loss at 220° F., % | Tabular Al$_2$O$_3$ Nominal Size | | Tensile Strength, psi(2) |
|---|---|---|---|---|---|---|---|---|---|
| | | | +50 mesh +297 microns | +80 mesh +177 microns | −150 mesh −105 microns | | Mesh | (Microns) | |
| 1 | A | 0.05 | 15.5 | 27.2 | 49.7 | 11.8 | −100(3) | (−149) | 206 |
| 2 | A | 0.03 | 15.7 | 28.5 | 45.0 | 14.4 | −60(4) | (−250) | 111 |

TABLE II-continued

| Sample No. | Dry[1] Mix | ZDNYL FSN, % | Actual Wet Screen Analysis, % +50 mesh +297 microns | +80 mesh +177 microns | −150 mesh −105 microns | Moisture Loss at 220° F., % | Tabular Al$_2$O$_3$ Nominal Size Mesh | (Microns) | Tensile Strength, psi[2] |
|---|---|---|---|---|---|---|---|---|---|
| 3 | A | 0.03 | 13.8 | 27.8 | 42.6 | 15.9 | −60 | (−250) | 148 |
| 4 | A | 0.05 | 15.0 | 28.9 | 44.5 | 12.0 | −60 | (−250) | 176 |

TABLE III

| Sample No. | Dry[1] Mix | ZDNYL FSN, % | Actual Wet Screen Analysis, % +50 mesh +297 microns | +80 mesh +177 microns | −150 mesh −105 microns | Moisture Loss at 220° F., % | Tabular Al$_2$O$_3$ Nominal Size Mesh | (Microns) | Tensile Strength, psi[2] |
|---|---|---|---|---|---|---|---|---|---|
| 5 | B | 0.05 | 10.0 | 21.2 | 51.3 | 13.3 | −60 | (−250) | 206 |
| 6 | B | 0.05 | 10.1 | 18.6 | 58.2 | 13.0 | −100 | (−149) | 134 |
| 7 | B | 0.03 | 9.9 | 20.8 | 52.2 | 15.3 | −60 | (−250) | 152 |
| 8 | B | 0.03 | 10.7 | 21.7 | 53.9 | 13.5 | −60 | (−250) | 248 |

TABLE IV

| Sample No. | Dry[1] Mix | ZDNYL FSN, % | Actual Wet Screen Analysis, % +50 mesh +297 microns | +80 mesh +177 microns | −150 mesh −105 microns | Moisture Loss at 220° F., % | Tabular Al$_2$O$_3$ Nominal Size Mesh | (Microns) | Tensile Strength, psi[2] |
|---|---|---|---|---|---|---|---|---|---|
| 9 | C | 0.03 | 5.8 | 13.5 | 64.5 | 13.5 | −60 | (−250) | 191 |
| 10 | C | 0.05 | 5.9 | 13.4 | 62.7 | 13.3 | −60 | (−250) | 190 |
| 11 | C | 0.05 | 5.8 | 11.2 | 68.2 | 13.9 | −100 | (−149) | 99 |

[1] From Table I
[2] At 2000° F., average of 6 samples.
[3] Actual size distribution range was: 0.2% −50 +80 mesh (−297 +177 microns); 0.2% −80 +100 mesh (−177 +149 microns); 6.4% −100 +150 mesh (−149 +105 microns); 24.6% −150 +200 mesh (−105 +74 microns); 68.6% −200 mesh (−74 microns)
[4] See Table I for actual size range distribution A statistical analysis of the data from the Tables above indicates that it is desirable for enhancing hot tensile strength that (i) the +50 mesh (+297 microns) fraction of all the particulate materials should be less than 12 weight percent; (ii) the +80 mesh (+250 microns) fraction should be less than 22 weight percent and greater than 12 weight percent; and (iii) the −150 mesh (−105 microns) fraction should be less than 35 percent. The data also indicates that the nominal −60 mesh (−250 microns) T61 tabular alumina also is preferable to the −100 mesh (−149 microns) size and that the moisture loss at 104° C. (220° F.) should preferably be less than 13.5 percent. Sample 8 made with mix B, a surfactant level of 0.03 percent, nominal −60 mesh (−250 microns) T61 tabular alumina and having a moisture loss of 13.5 percent had the highest level of hot tensile strength at 248 psi of any of the samples tested.

I claim:

1. A mortar which consists essentially of:
a solid particulate material constituent selected from the group consisting of crystobalite, tridymite, fused silica and mixtures thereof, said constituent providing 25 to 88 percent SiO$_2$ of the total solid particulate materials in said mortar on a dry basis, a solid particulate material constituent providing 6 to 65 percent Al$_2$O$_3$ in said mortar on a dry basis, a constituent providing 7 to 12 percent P$_2$O$_5$ of the solid particulate materials on a dry basis, at least seventy percent of said P$_2$O$_5$ being provided in colloidal form, said mortar including not more than 4 percent of other solid particulate material constituents, not more than 45 percent by weight of the solid particulate material constituents in said mortar having a size less than 74 microns, said liquid in the mortar being limited to an amount such that the weigth loss of the mortar on heating to a temperature of 104° C. 220° F. will not exceed 13.5 percent of the total weight of the mortar, the total weight loss of the mortar on heating to a temperature of 1100° C. (2012° F.) being not in excess of 15 percent, said mortar having at least 7 percent by weight P$_2$O$_5$ after heating at said temperature of 1100° C. (2012° F.).

2. The mortar of claim 1 which is characterized by substantially all of the P$_2$O$_5$ being provided in colloidal form.

3. The mortar of claim 2 which is characterized by SiO$_2$ being 60 to 70 percent, the A$_2$O$_3$ being 25 to 35 percent, the P$_2$O$_5$ being 7 to 11 percent and the other solid constituents not more than two percent.

4. The mortar of claim 3 which is characterized by the P$_2$O$_5$ being 8 to 10 percent.

5. The mortar of claim 2 which is characterized by less than 12 percent by weight of said solid particulate materials having a size greater than 297 microns and not more than 35 percent having a size less than 74 microns.

6. The mortar of claim 5 which is characterized by less than 22 percent and more than 12 percent by weight of the solid particulate materials having a size greater than 177 microns, and at least 50 percent of the solid particulate materials have a size less than 105 microns.

7. The mortar of claim 5 which is characterized by not more than 40 percent of the Al$_2$O$_3$ having a size less than 74 microns.

8. The mortar of claim 7 which is further characterized by said mortar including 0.01 to 0.10 percent by weight of a low foaming surfactant compatible with acidic systems.

* * * * *